US007367232B2

(12) United States Patent
Vaganov et al.

(10) Patent No.: US 7,367,232 B2
(45) Date of Patent: May 6, 2008

(54) SYSTEM AND METHOD FOR A THREE-AXIS MEMS ACCELEROMETER

(76) Inventors: Vladimir Vaganov, 129 El Porton, Los Gatos, CA (US) 95032; Nickolai Belov, 118 Plazoleta, Los Gatos, CA (US) 95032

( * ) Notice: Subject to any disclaimer, the term of this patent is extended or adjusted under 35 U.S.C. 154(b) by 160 days.

(21) Appl. No.: 11/042,721

(22) Filed: Jan. 24, 2005

(65) Prior Publication Data
US 2005/0160814 A1 Jul. 28, 2005

Related U.S. Application Data

(60) Provisional application No. 60/538,638, filed on Jan. 24, 2004.

(51) Int. Cl.
*G01P 15/12* (2006.01)
(52) U.S. Cl. .................................. 73/514.33
(58) Field of Classification Search ............... 73/514.33
See application file for complete search history.

(56) References Cited

U.S. PATENT DOCUMENTS

| 4,869,107 | A | * | 9/1989 | Murakami | 73/514.33 |
|---|---|---|---|---|---|
| 4,967,605 | A | * | 11/1990 | Okada | 73/514.33 |
| 5,005,414 | A | * | 4/1991 | Holland et al. | 73/514.33 |
| 5,095,762 | A | * | 3/1992 | Holm-Kennedy et al. | 73/514.33 |
| 5,231,879 | A | * | 8/1993 | Yamamoto | 73/514.33 |
| 5,295,386 | A | * | 3/1994 | Okada | 73/514.33 |
| 5,485,749 | A | * | 1/1996 | Nohara et al. | 73/514.33 |
| 5,537,882 | A | * | 7/1996 | Ugai et al. | 73/514.33 |

* cited by examiner

*Primary Examiner*—John E. Chapman

(57) ABSTRACT

A system and method for inputting motion measurement data into a computationally based device are provided. In a first version three-axis accelerometer determines components of an inertial force vector with respect to an orthogonal coordinate system. The accelerometer includes a sensor die made of a semiconductor substrate having a frame element, a proof mass element, and an elastic element mechanically coupling the frame and the proof mass. The accelerometer also has three or more stress-sensitive IC components integrated into the elastic element adjacent to the frame element for electrical connectivity without metal conductor traversal of the elastic element.

13 Claims, 14 Drawing Sheets (a)

(b)

(PRIOR ART)

(PRIOR ART)

(a)

(PRIOR ART)

(b)

(PRIOR ART)

(a)

(b)

(a)

(b)

(a)

(b)

(a)

(b)

(a)

(b)

(a)

(b)

(a)

(b)

SYSTEM AND METHOD FOR A THREE-AXIS MEMS ACCELEROMETER

This application is a Continuation to Provisional Patent Application No. 60/538,638 filed on Jan. 24, 2004, and which is incorporated herein by reference in its entirety and for all purposes.

REFERENCES

U.S. patent documents

| 1. 4,967,605 | November 1990 | Okada | 73/517 |
| --- | --- | --- | --- |
| 2. 5,182,515 | January 1993 | Okada | 73/517 |
| 3. 5,295,386 | March 1994 | Okada | 73/517 |
| 4. 5,485,749 | January 1996 | Nohara | 73/517 |

BACKGROUND OF THE INVENTION

1. Field of the Invention

This invention relates to semiconductor devices, Micro Electro Mechanical Systems (MEMS), sensors and more specifically to three dimensional (3D) three-axis accelerometers, vibration sensors and inclinometers for consumer and other applications.

2. Description of the Related Art

MEMS accelerometers are known for more than 25 years and they are widely used in different areas. Automotive air-bag applications currently represent the biggest MEMS accelerometer market. Furthermore, there are only few known MEMS accelerometers that can measure all three components of an acceleration vector, three-axis accelerometers and 3D accelerometers.

The market for 3D accelerometers includes hand-held devices, cell phones, PDAs, hand-held computers, gaming devices, remote controls, etc., health and sport products including ergometers, smart shoes, patient posture indicators, pacemakers, biometric devices and systems, etc., monitoring systems for civil projects such as bridges, buildings, etc., smart toys, virtual reality devices, and more. However, these markets require low-cost, stable and reliable three-axis accelerometers, which have impeded market growth because of their high cost. The cost of 3D accelerometers can be dramatically reduced Therefore, there is a need for low-cost single die 3D accelerometer that possesses all the above-mentioned features.

FIG. 1 illustrates the principle and shows a structure of a three-axis accelerometer die with an elastic element in the form of uniform diaphragm 14 serving, as a suspension of a proof mass. The structure contains a frame 12, a proof mass 16 and a suspension 14 that connects the frame 12 and the proof mass 16. The proof mass 16 is characterized by its three dimensions: length 71, width 72, and thickness 73. Similarly, the suspension 14 is characterized by its three dimensions: length 74, width 75, and thickness 76. In general, thickness of the frame 77 can be different from the thickness 73 of the proof mass 16. The structure is formed in a silicon wafer using deep etching from the backside of the wafer, as it is shown in FIG. 1.

Center of gravity 9 of the proof mass 16 is located below the neutral plane of the suspension 14. Being loaded with vertical (Z) acceleration (perpendicular to the front surface of the chip), the proof mass 16 moves vertically following the direction of the force of inertia (FOI) 11. At a lateral acceleration (X or Y), parallel to the surface of the chip, the proof mass moves in rocking mode. One side of the proof mass 16 tends to move up and its other side tends to move down. In general case, as it shown in FIG. 1, when FOI 11 is applied in a random direction, the motion of center of gravity has all three components x, y, z in the coordinate system X, Y, Z.

Vertical acceleration creates stresses of the same sign along the periphery of the diaphragm. Lateral acceleration creates stresses of different sign along the periphery of the diaphragm near the frame and adjacent to the areas where the proof mass is coupled with the diaphragm. Stress distribution in the diaphragm depends on the direction of acceleration vector and this stress distribution is unique for each combination of direction and magnitude of acceleration vector.

Stress sensors 1, 2, 3, 4, 5, 6, 7, 8, located in eight local areas on the diaphragm, sense the stress created by a force. Being properly located in different places on the diaphragm, stress sensors provide signals representative of the local stress sensed, which allow measuring all three components of acceleration vector.

If other than a diaphragm type of suspension is used then the vertical acceleration will create stresses of the same sign in the respective areas of suspension. Lateral components of acceleration create stresses of different magnitudes in local positions of the suspension.

As a result, lateral components of acceleration vector can be detected, for example, using a differential signal from the sensors and vertical component of acceleration vector can be detected using sum of the signals from some of the sensors or all sensors.

The 3D accelerometers based on micromachined silicon chips with piezoresistors on the elastic element, suspension, for example flexible diaphragm or beams are known. Prior art, shown in FIGS. 1 and 2(a)-(b), uses a sensor chip 10 with a rigid frame 12 and a proof mass 16 of a die, connected with the frame by a thinner elastic element 14. In FIG. 1 this elastic element is a diaphragm. In FIG. 2(a) and FIG. 2(b) the elastic element is a combination of beams 90, 92, 94, 96.

Fabrication of 3D accelerometer die described in U.S. Pat. No. 5,485,749 and shown in FIG. 2b requires a non-standard initial material—silicon-on-insulator (SOI) wafers with buried cavities 80 formed in the handle wafer 82 below the suspension beams 14 before bonding handle wafer 82 and device wafer. After thinning of the device wafer the device layer 84 is used for suspension beams 14.

Use of non-standard initial material is undesirable in high-volume production for reasons including: high cost of initial material, additional processing steps in fabrication, limited number of suppliers, and potentially lower quality than standard initial materials.

FIG. 3(a)-(b) illustrates the examples of prior art piezoresisrors layout on the surface of elastic elements of three-axis accelerometers.

The piezoresistors 1, 3, 5, 7 in FIG. 1 are located at the periphery of the diaphragm adjacent to the frame 12, while piezoresistors 2, 4, 6, 8 are adjacent to the proof mass 16 and proper corresponding resistors are electrically connected into three Wheatstone bridges accommodating X, Y and Z components of an applied inertia force vector.

The disadvantages of these designs can be summarized as having: large numbers of stress sensitive components, poor long-term stability due to the metal interconnections on the surface of the suspension for the bridges, limited mechanical overload protection, large fluctuations in X, Y, Z sensitivities, large cross-axis sensitivity, no process integration with other sensors and CMOS, no scaling down in size and cost without compromising its performance.

SUMMARY OF THE INVENTION

A method and device for measuring three components of inertial force (or acceleration) vector with respect to an orthogonal coordinate system is presented. The invented method comprises the steps of: 1) providing a semiconductor sensor chip, said semiconductor sensor chip comprising a frame element, a proof mass element and an elastic element mechanically coupling said frame and said proof mass elements; 2) providing three stress-sensitive IC components integrated into the elastic element and adjacent to the frame element for electrical connectivity without conductors traversal of elastic element surface; 3) calibrating said three stress-sensitive IC components by applying a known inertial force to said sensor chip in at least three directions and determining offsets of said three or more stress-sensitive IC components and matrix of sensitivities of said three or more stress-sensitive IC components to orthogonal components of known inertial force vector; 4) applying an unknown 3D inertial force vector that needs to be measured to said sensor chip; 5) measuring output signals of said at least three stress-sensitive IC components; and 6) calculating three orthogonal components of said unknown 3D inertial force vector by solving a system of at least three equations containing said three orthogonal components of unknown 3D inertial force vector, offsets and matrix of sensitivities of said at least three stress-sensitive IC components to orthogonal components of known inertial force vector.

A present invention embodiment describes a small-size single-die three-axis MEMS accelerometer that provides high sensitivity to acceleration, equal or comparable sensitivity to all three components of acceleration vector, low cross-axis sensitivity, low power consumption, high reliability and high long-term stability. This three-axis accelerometer has extremely low cost, especially in high volume production, due to a simple high-yield micromachining process fully compatible with IC processing, low-cost packaging based on both wafer-level packaging and a low-cost molding and also a simple testing process.

Three-axis MEMS accelerometer according to the present invention contains a sensor die made of a semiconductor substrate and having top side and bottom side; said die contains: 1) a frame element having thickness; 2) a proof mass having length, width and thickness; 3) an elastic element mechanically connecting the frame and the proof mass; said elastic element has length, width and thickness; an inertial force applied to said proof mass causes stress in the elastic element; 4) three or more stress-sensitive IC components integrated into the elastic element and adjacent to the frame element for electrical connectivity without metal conductors traversal of elastic element surface; each of said three or more stress-sensitive IC components generates a signal in response to the stress in the elastic element.

Three components of acceleration vector are extracted from at least three independent electrical signals from at least three sensors.

Stress sensitivity or piezo-sensitivity is related to dependence of the mobility of electrons and holes on mechanical stress. Therefore, all basic IC components: resistors, diodes, bipolar transistors, MOS transistors are stress-sensitive and can be used as stress sensors.

Location of the stress-sensitive components on the suspension is, preferably, chosen to maximize output signal of these stress-sensitive components by: (a) placing them into areas with the maximum level of stress and (b) defining current flow through these components in the direction of the highest piezo-sensitivity. Besides, location of the sensors is chosen in such a way that signal of the sensors depends differently on the direction and magnitude of acceleration vector. Therefore, all three components of acceleration vector can be determined using signals from three sensors.

Sensitivity of the 3D accelerometer according to the present invention is increased due to using a combined proof mass consisting of at least two parts. The first part of the proof mass is an integral part of the sensor die and at least one other part is made from a material that has density substantially higher than the material of the semiconductor substrate.

Besides that, the present invention provides a way to further increase of sensitivity of the three-axis accelerometer by increasing the size of at least one part of the proof mass coupled to the first part. The part of the proof mass coupled to the first part can occupy a portion of the volume between the first part of the proof mass, frame of a sensor die and at least one cap. Therefore, the combined proof mass can have length and width bigger than corresponding overall dimensions of the elastic element and thickness bigger than the frame thickness.

Both the sensors and the IC circuits formed on the sensor chip have electrical connections with electrical contact means located on the frame of the sensor chip. For example, said electrical contact means can be formed as metallized bond pads suitable for wire bonding or as bond pads with under-bump metallization suitable for electrical and mechanical connection with the solder bumps, or as solder bumps, or solder balls.

Voltage, frequency, pulse width, current or other parameter can be used as an output signal in the three-axis MEMS accelerometer according to the present invention. Each of the sensors is characterized by an offset and its sensitivity to three independent components of acceleration vector.

It is beneficial to incorporate in three-axis accelerometer at least one set of electrical components (reference set), which provides a reference output signal for differential comparison with the output signals from each of at least three sensors. Reference set either has no sensitivity to acceleration or has significantly smaller sensitivity to acceleration than the sensors but it has similar sensitivity to influencing parameters, for example temperature. Preferably, for all the sensors, the offset is close to the reference level and both offset and reference level are close to the middle of the range of the output signal. Three components of acceleration vector are extracted from at least three independent electrical signals from at least three sensors, preferably, measured with respect to the reference electrical signal.

The three-axis MEMS accelerometer according to present invention can also contain temperature sensor, signal-conditioning means, digital signal processing means, memory, wireless communication means, and power management means.

In general, both sensor and reference signals are temperature dependent. This dependence is parasitic and its compensation increases accuracy of the accelerometer and makes its working range wider. A temperature sensor located in the same package, preferably, integrated on the accelerometer die or integrated with signal conditioning means is used for compensation of temperature dependence of the output signals of sensors.

Signal conditioning means contain at least some of the following units: voltage regulator, analog multiplexer, analog-to-digital converter (ADC), frequency-to-digital converter (FDC), pulse-width-to-digital converter (PWDC), signal filtering means, output registers for storing digital data after conversion, and other. Circuits included in the signal conditioning means can be integrated together with the sensors on the sensor chip or can be placed on a different chip. Preferably, at least temperature sensor is integrated on the sensor chip. Other components of signal conditioning means, for example, differential amplifiers, analog multiplexer, voltage regulator and others, also can be integrated on the sensor chip.

Digital signal processing means are used for processing of digitized data from sensors and reference set. Data from the temperature sensor is also digitized and used in digital signal processing.

Memory is used to store calibration data for three-axis MEMS accelerometer. Calibration data includes at least some of the following: for each of sensors—sensitivity to acceleration in three different directions, offsets, temperature coefficients of sensitivity, temperature coefficients of offsets, quadratic terms that determine non-linearity of sensitivity in the working acceleration range in three different directions, and other parameters useful for description of the transduction characteristic of the three-axis MEMS accelerometer. Calibration data for temperature sensor includes sensitivity to temperature and offset. Calibration data is used in digital signal processing.

Both said digital signal processing means and memory can be parts of the three-axis MEMS accelerometer according to present invention. Processor and memory can be integrated on the same chip with the sensors. Digital signal processing means and memory also can be fabricated on a separate chip assembled together with the three-axis accelerometer die within one package or within one device, for example, a hand-held device where digital signal from the three-axis accelerometer can be processed by one of the processors existing in the hand-held device.

The three-axis MEMS accelerometer according to present invention can contain wireless communication means. Said wireless communication means, preferably, include transmitter, receiver, antenna, modulator, demodulator, and wireless data processing means. Wireless communication means allows three-axis MEMS accelerometer to communicate with other wireless devices like cell phones and PDAs, gaming devices, handheld computers, laptops, desktop computers, and other devices equipped with a wireless communication means. Preferably, the three-axis MEMS accelerometer according to the present invention is capable to communicate with other wireless devices through a wireless channel according to at least one of the following protocols/standards: 802.11 a, b, g and others from 802.11 family, Bluetooth, 802.15.4/ZigBee and others. Wireless communication means can be placed on a separate chip, integrated on one chip with the digital signal processing means. In particular, the same processor that processes wireless data can do processing of the digitized sensor data as well. In a preferred embodiment, sensors, signal conditioning means, digital signal processing means, and wireless communication means are integrated on the sensor chip.

The three-axis accelerometer according to present invention can contain also power management circuit, which reduces its power consumption. This feature is beneficial when three-axis accelerometer is used in portable devices: cell phones, gaming devices, handheld computers, etc.

All features described above including reference signal, signal conditioning circuits and digital signal processing circuit, memory, wireless, etc. are illustrated in FIG. 14 where a generalized block-diagram of 3D accelerometer is presented. The output signals from stress-sensitive components $S_2$ (180), $S_2$ (182), and others up to SN (188) are applied to the inputs of differential amplifiers 192-194 with respect to a reference signal coming from a reference signal component 190. Signals generated by stress-sensitive IC components from the applied force, are measured relative to a reference signal for increasing the ratios of the signals to offsets, reducing the temperature dependence of offsets and sensitivities and simplifying signal processing. In this particular case only one reference signal is used for all sensors. In other cases several reference signals can be used. After amplification the signals can go to a multiplexer 196 and then to analog-to-digital converter 198. Digital signal then can go to a digital signal processing unit 200, which has memory 204. Memory 204, as it was described above, besides other functions for processing is also used for storing the calibration and compensation coefficients 204. The results of the calculated measurements through interface 206 are available from output 208 for different applications. FIG. 14 also illustrates wireless unit 210, which can transmit the result of the measurements wirelessly.

Fabrication of the three-axis MEMS accelerometer requires processing of at least sensor wafers. Cap wafers are usually necessary for adequate mechanical and environmental protection of the mechanical structure formed on the sensor wafers. Cap wafers can be either just micromachined wafers with mechanical structures or contain some electronic components.

Processing of the sensor wafers is based on a combination of IC processing step and micromachining step. IC processing step is used in fabrication of the sensors and other electronic components integrated on the sensor wafer. Stress-sensitive components like piezoresistors, MOS transistors, bipolar transistors and stress-sensitive circuits combining these components are formed in the IC processing step. In order to have three stress-sensitive components with independent sensitivities to all three components of the acceleration vector these stress-sensitive components should have some predetermined layout are should be formed in the predetermined locations on the substrate. Other above-discussed components and blocks integrated on the same chip with the stress-sensitive components are also fabricated in the same IC process. Components integrated with the sensors may include other sensors, for example, temperature sensor, voltage regulator, differential amplifiers, analog multiplexer, clock, ADC, FDC, PWDC, registers, memory, processor, and other components. IC processing is done before micromachining. It is preferable to use a standard IC process, like CMOS, Bi-CMOS, bipolar process, etc. for fabricating stress-sensitive components and, when applicable, other IC components and circuits on sensor wafers.

Micromachining step requires at least deep micromachining from the backside of the sensor wafer. There are several micromachining process options. One option requires deep dry etching another option is based on deep wet etching, and others, as combinations of the above.

Proof mass and suspension are protected by one or two caps connected to the frame of the sensor chip. The top cap is bonded to the front side of the sensor wafer and the bottom cap is bonded to the back side of the sensor wafer. Caps are necessary for both mechanical shock overload and environmental protection of the mechanical structure and electrical components of the three-axis accelerometer. Mechanical structure formed in the cap wafer contains at least one of the following elements: shallow air-damping recess, stops, bonding area. Top cap also has grooves that allow removing portions of the wafer located above the bond pads, therefore, providing access to the bond pads. Bottom cap also may have grooves that allow removing portions of the bottom cap wafer after bonding. This feature can be used, for example, in multi-chip module assembly for stack wire bonding.

Wafer-level bonding of a sensor wafer with cap wafers is a first level of packaging, namely, wafer-level packaging. Wafer-level packaging provides protection of the three-axis accelerometer mechanical structure on overload, mechanical contacts with surrounding objects, from contamination, moisture, etc.

Functional testing of the three-axis MEMS accelerometer is, preferably, done both on the wafer level and after assembly and packaging. Functional testing at the wafer level is an important step toward low-cost product because it allows rejecting dies that do not meet spec already at the wafer level without packaging them.

Low-cost functional testing after assembly and packaging is achieved by minimizing the number of measurements necessary for full characterization of the transduction characteristic of the accelerometer. This goal is achieved by choosing such a number of sensors and their layout that minimizes cross-axis sensitivity and, therefore, simplifies extracting offsets and sensitivities of the sensors by measuring their response in a minimum number of positions.

All elements can vary in design and material in order to realize different aspects and advantages.

A first alternate preferred embodiment of the method of the present invention provides a three-axis accelerometer having one or more of the following elements or means:

- a sensor die made of a semiconductor substrate and having top side and bottom side;
- a frame element having thickness being a part of the sensor die
- a proof mass having length, width and thickness being a part of the sensor die
- an elastic element mechanically connecting the frame and the proof mass; said elastic element has length, width and thickness;
- an elastic element having non-uniform thickness;
- an elastic element having at least one through opening in its thickness dimension;
- an elastic element having the shape chosen from the group shapes consisting of: ring, perforated ring, n-sided faceted geometry, beams, tethers, springs and combination of above
- an elastic element having a stress-concentrating element presenting a V-groove, a groove having a trapezoidal cross section, a groove having the sidewalls forming an angle in the range of 90°±5° with the surface of the elastic element;
- at least one cap chip having thickness and mechanically connected to said frame element at least from the bottom side of the sensor chip;
- a proof mass having at least a part made of a material having substantially larger density than the semiconductor substrate;
- a proof mass consisting of at least two parts, where one part is an integral part of a sensor die and at least one another part coupled to the first part and occupying a portion of the volume between the first part of the proof mass, the frame of a sensor die and the cap.
- a proof mass having at least two dimensions out of length, width and thickness bigger than the corresponding dimensions of the elastic element;
- a proof mass having bigger thickness than thickness of the frame and smaller thickness than the combined thickness of the frame and the cap connected to the bottom side of the sensor die;
- three or more stress-sensitive IC components integrated into the elastic element and adjacent to the frame element for electrical connectivity without metal conductors traversal of elastic element surface; each of said three or more stress-sensitive IC components generates a signal in response to the stress in the elastic element;
- three or more stress-sensitive IC components chosen from the group of stress sensitive IC components consisting essentially of: a piezoresistor, a p-n junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit.
- at least one electronic circuit providing one or more functions from a group of functions consisting of: sensing of physical parameters, sensing of chemical parameters, providing reference signals, analog amplifying, analog multiplexing, signal filtering, analog-to-digital conversion, signal processing, voltage stabilization, current stabilization, memory for compensation coefficients, temperature compensation, digital interface, power management, transmitting and receiving radio-signals, and management of charging from piezoelectric elements;
- at least one electronic circuit located on a sensor chip having at least its portion located in the area directly above at least a part of proof mass.
- at least one electronic circuit comprising sensor components chosen from the group of sensors consisting of: temperature sensor, magnetic sensor, pressure sensor, tactile sensor, acoustic sensor, chemical sensor, humidity sensor, radiation sensor, mass flow sensor, optical sensor
- a signal generated by three or more stress-sensitive IC components in response to the stress in the elastic element measured relative to at least one reference signal generated by said at least one electronic circuit.
- a package or substrate providing integration of two, more than two or all the subcomponents, components or elements of the three-axis accelerometer;
- an electronic circuit for processing output signals from the mechanical stress sensitive components and providing the separation of the three-dimensional output signals in either Cartesian or spherical system of coordinate;
- a semiconductor substrate made from material chosen from the group consisting of: one or more elements selected from the IV group of the Periodic Table, silicon, germanium, silicon carbide, diamond like carbon; elements from III and V groups of the Periodic Table, gallium arsenide, gallium nitride, indium phosphide;
- three or more stress-sensitive components using highly-doped Si layers (p+ or n+) or highly-doped poly-silicon layers (also p+ or n+) for connection with the metal lines located in the frame area only.

three or more stress-sensitive components having low sensitivity of electrical parameters and sensitivity to misalignment due to its layout;

stress-sensitive components on (100) silicon wafers utilizing p-type piezoresistors oriented along [110]family crystallographic directions and perpendicular to each other;

a temperature sensor located on the frame of the sensor chip in a stress-free area;

a temperature sensor based on p-n junction;

a temperature sensor based on a resistive divider formed with resistors having substantially different thermal coefficient of resistance (TCR);

a circuit for providing a reference signal that is close to the middle point of the voltage range available for the three-axis accelerometer;

a circuit for providing a reference signal based on a resistive divider;

a circuit where output signal of the temperature sensor is measured with respect to a reference voltage;

a circuit where the same reference signal is used in measurements of output signals of all stress-sensitive components;

a circuit where the same reference signal is used in measurements of output signals of all stress-sensitive components and all other sensors.

DETAILED DESCRIPTION OF THE PREFERRED EMBODIMENTS

Figure 1:
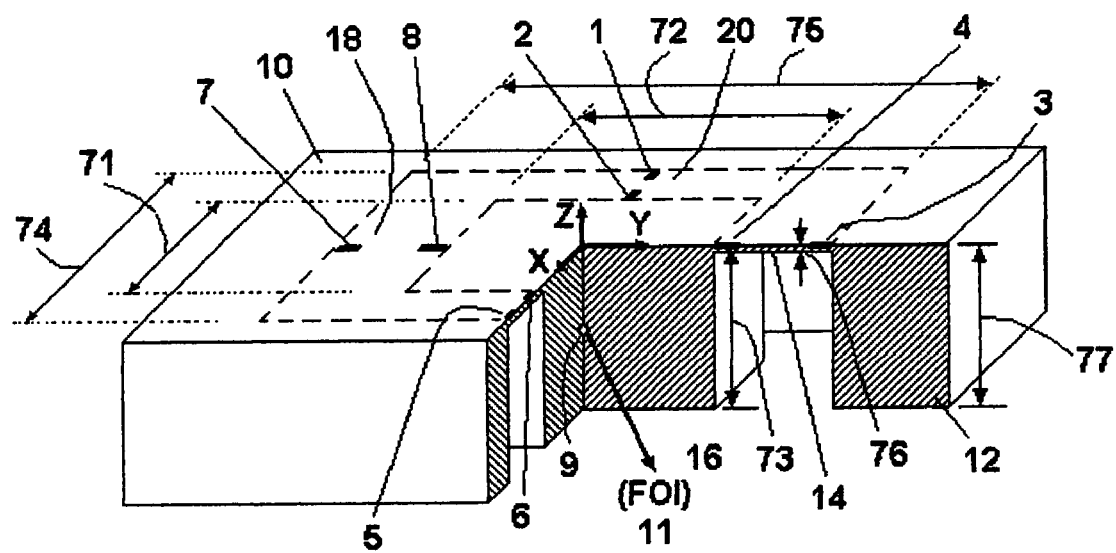
FIG. 1 shows an example of mechanical structures of three-axis accelerometer sensor chip illustrating the principle of three-dimensional measurement of inertia force vector components.
Figure 2:
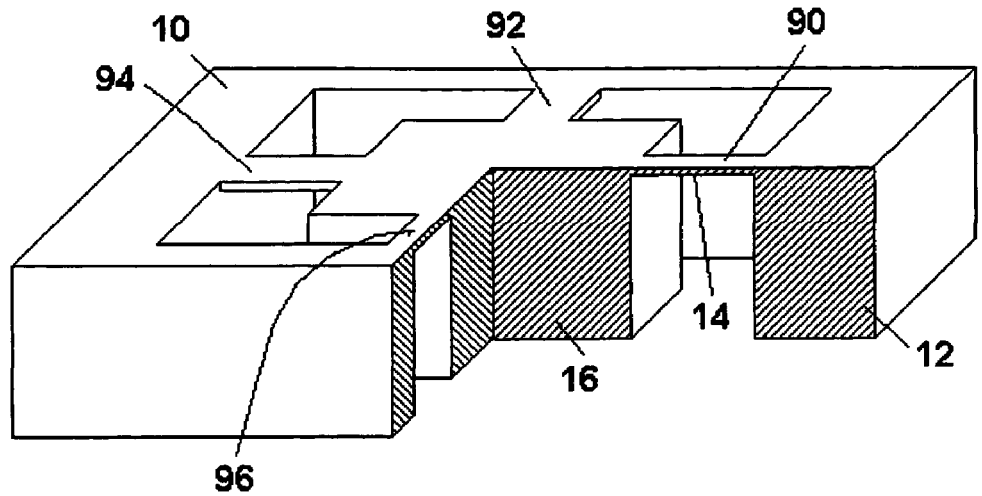
FIG. 2 shows prior art mechanical structures of three-axis accelerometers.
Figure 2:
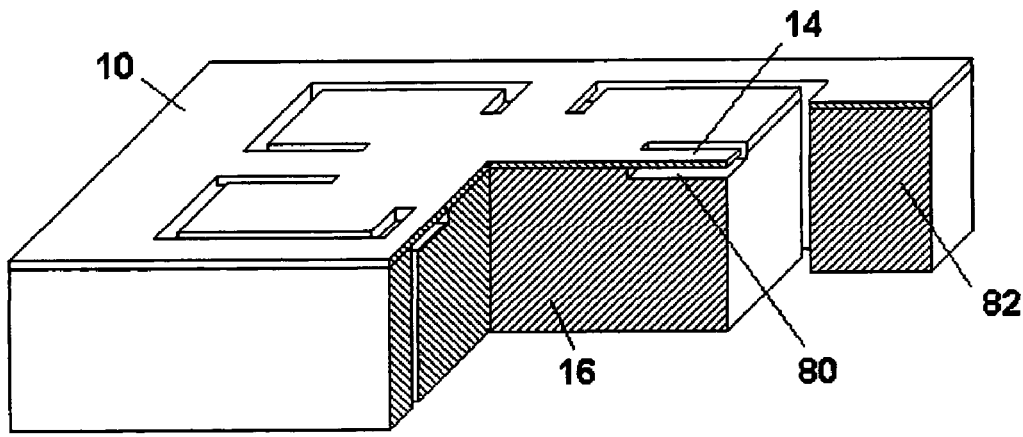
Figure 3:
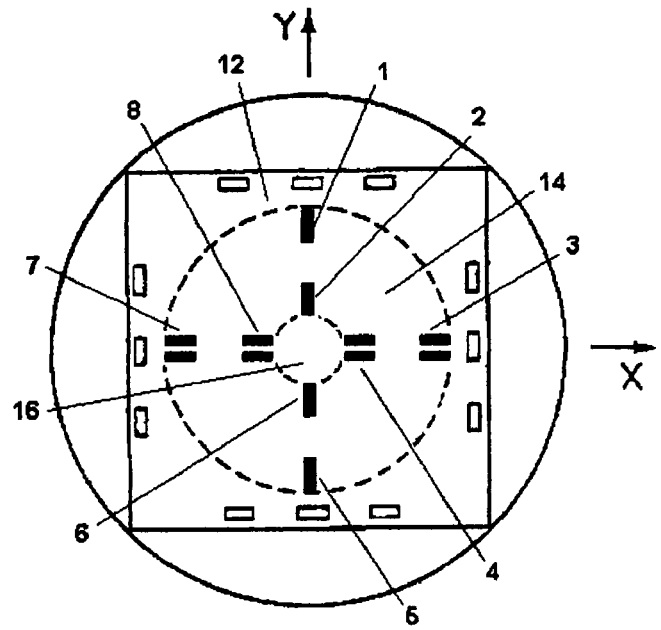
FIG. 3 shows prior art layouts of piezoresistive circuits used in three-axis accelerometers.
Figure 3:
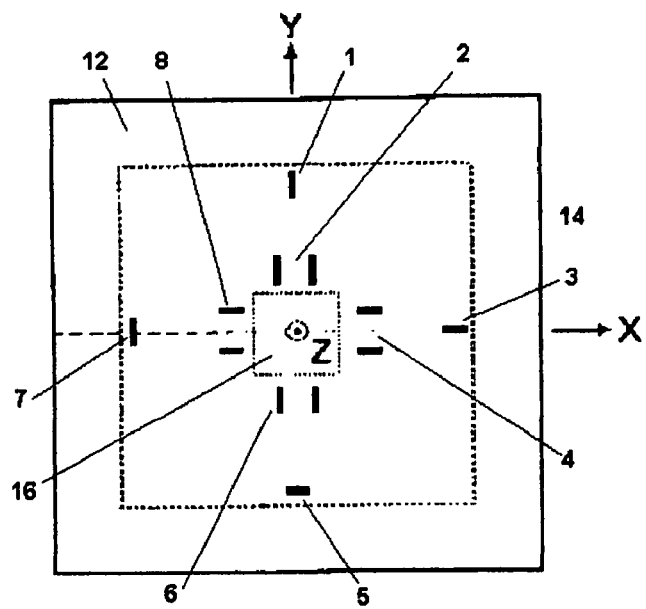
Figure 4:
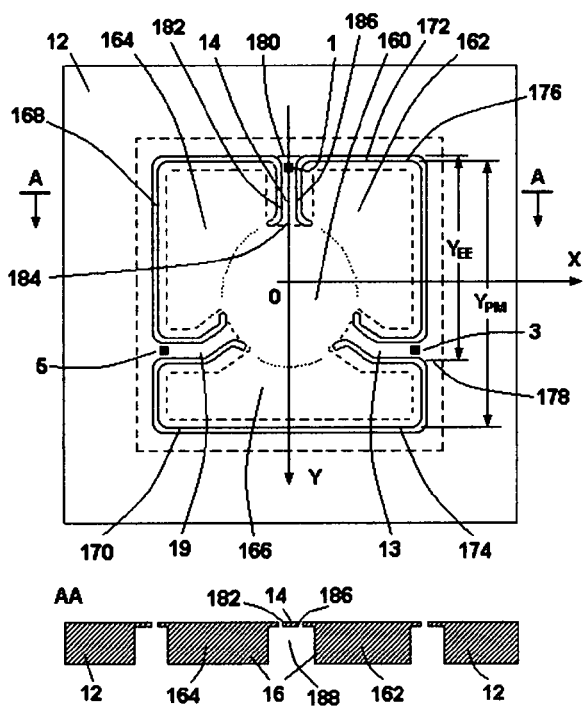
FIG. 4 shows examples of sensor structures with stress-sensitive components, illustrating the invented method of measurement of three-dimensional vector of inertia force according to the second embodiment of present invention
Figure 4:
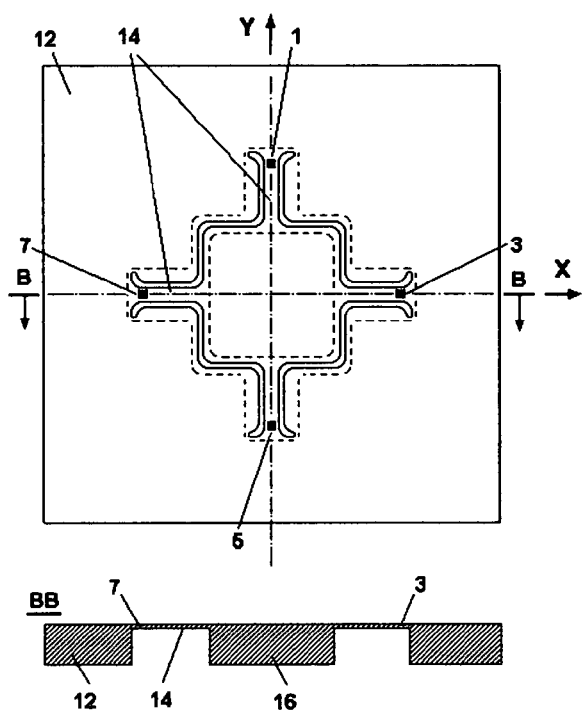

The cost of 3D accelerometers can be dramatically reduced by 1) using one MEMS chip that can measure all three components of acceleration, 2) testing functionally on the wafer level, 3) using low-cost packaging and 4) integrating signal conditioning circuits either on the same chip or in the same package.

An object of the present invention is to provide a method of measuring three components of the inertial force vector with respect to an orthogonal coordinate system.

Another object of the present invention is to provide a three-axis accelerometer for detecting three orthogonal components of inertial force vector with respect to an orthogonal coordinate system.

Another object of the present invention is to provide a three-axis accelerometer for high volume consumer markets like cell phones, portable gamers, digital cameras, etc.

Another object of the present invention is to provide a low cost three-axis accelerometer.

Another object of the present invention is to provide a small size three-axis accelerometer.

Another object of the present invention is to provide a high reliability three-axis accelerometer.

Another object of the present invention is to provide a high stability three-axis accelerometer.

Another object of the present invention is to provide a three-axis accelerometer, which accommodates a required ratio between X, Y, Z sensitivities.

Another object of the present invention is to provide a three-axis accelerometer, which has low cross-axis sensitivity.

Another object of the present invention is to provide a three-axis accelerometer, which allows process integration with other sensors and IC circuitry.

Another object of the present invention is to provide a three-axis accelerometer, which allows process integration with standard CMOS.

Another object of the present invention is to provide three-axis accelerometer, which is scalable.

Another object of the present invention is to provide a three-axis accelerometer, which features low power consumption.

Another object of the present invention is to provide a three-axis accelerometer, which provides high sensitivity to acceleration.

Another object of the present invention is to provide a three-axis accelerometer, which allows economic manufacturability for high volume consumer markets.

FIGS. 4-13 show various embodiments of three-axis accelerometer and die microstructures. The detailed description of a method of measuring three components of inertial force, the microstructures and devices according to the present invention are presented below in nine embodiments.

Referring to an embodiment of measuring three components of force or acceleration vector with respect to an orthogonal coordinate system, the method comprises the steps of: 1) providing a semiconductor sensor chip, said semiconductor sensor chip comprising a frame element, a proof mass element and an elastic element mechanically coupling the frame and proof mass elements; 2) providing three stress-sensitive IC components integrated into the elastic element and adjacent to the frame element for electrical connectivity without conductor traversal of elastic element surface; 3) calibrating the three stress-sensitive IC components by applying a known inertial force to the sensor chip in at least three directions and determining offsets of the three or more stress-sensitive IC components and matrix of sensitivities of the three or more stress-sensitive IC components to orthogonal components of known inertial force vector; 4) applying an unknown 3D inertial force vector that needs to be measured to the sensor chip; 5) measuring output signals of said at least three stress-sensitive IC components; and 6) calculating three orthogonal components of the unknown 3D inertial force vector by solving a system of at least three equations containing the three orthogonal components of unknown 3D inertial force vector, offsets and matrix of sensitivities of the stress-sensitive IC components to orthogonal components of known inertial force vector.

Using only three stress-sensitive components or sensors for measuring three components of acceleration vector with respect to an orthogonal coordinate system has certain advantages. First, using three stress-sensitive components instead of 8-12 stress-sensitive components used in the prior art allows conveniently place all stress-sensitive components in the areas where an inertial force applied to the proof mass causes the largest mechanical stresses. Orientation of stress-sensitive components with respect to the crystallographic axes of the semiconductor substrate is chosen to maximize their sensitivity to stress. As a result, the three stress-sensitive components have largest sensitivity.

Second, in contrast with previous designs, all stress-sensitive components can be positioned at the interface between the frame and the elastic element allowing electrical connection to these three stress-sensitive components without placing any metal traces on the elastic element. This greatly improves long-term stability of the three-axis accelerometer because it eliminates gradual stress relaxation of the necessary built-in stresses in the metal layers.

The third advantage of having only three stress-sensitive components instead of the previous 8 to 12, is the reduction in size of components. The lower number of stress-sensitive components allows making the suspension smaller, thus reducing the size and cost of the sensor.

Fourth, three stress-sensitive components consume less power than 8-12 components used in previous designs. Reduced power consumption is especially important for battery-powered devices, wireless devices and related applications.

Each of the three stress-sensitive components have an output signals proportional to the offset and sensitivity. In general, each of the three stress-sensitive components have different sensitivities to unit acceleration applied in three orthogonal directions. Sensitivity to unit acceleration vector acting in any other direction can be determined based on sensitivity of the stress-sensitive component to the unit acceleration applied in three orthogonal directions using superposition. Offset and sensitivities of a stress-sensitive component to acceleration applied in three orthogonal directions fully characterize a stress-sensitive component in the linear range of transduction. In order to determine offsets and sensitivities of the three stress-sensitive components the three-axis accelerometer are calibrated. During calibration a known inertial force, for example gravity, or other known acceleration, is applied to the three-axis accelerometer in three directions, preferably, in three orthogonal directions and output signals of the three stress-sensitive components are measured. Offset and three sensitivities of the stress-sensitive components to three orthogonal components of inertial force/acceleration are calculated based on the results of these measurements. Sensitivities of the three stress-sensitive components to inertial force/acceleration form a 3×3 matrix, which is referred to as matrix of sensitivities.

Mechanical design of the elastic element and the proof mass, location and orientation of the stress-sensitive components with respect to crystal axes of the semiconductor substrate should guarantee that sensitivities of the three stress-sensitive components are independent of each other, ie the matrix of sensitivities is of rank three.

After calibration the sensor is ready to be used for measurements of unknown inertial force vector. Output signals from all three sensors are used during this type of measurement. According to the superposition principle, two forces applied to the proof mass can be substituted by their sum and vice versa. Consequently, an unknown 3D inertial force applied to the proof mass of the three-axis accelerometer due to acceleration can be treated as a sum of its three components in a Cartesian coordinate system used in calibration of the three stress-sensitive components. As a result, sensitivities of the three stress-sensitive components to inertial force in this coordinate system are known. The three orthogonal components of unknown inertial force vector cause change of the output signal of the three stress-sensitive components. As sensitivities of the three stress-sensitive components to the components of the unknown inertial force vector are independent, the three components of the inertial force vector can be found from the system of three equations with three unknowns.

This system can be written in the matrix form as $$S \times X = (B - O), \qquad (1)$$

where S is a 3×3 matrix of sensitivities, X is a 3×1 unknown inertial force vector, B is a 3×1 vector of output signals of the three stress-sensitive components, and 0 is a 3×1 vector of offsets. This system has only one solution because the matrix S has rank of three and, therefore, an inverse matrix $S^{-1}$ exists and can be found. By multiplying both sides of equation (1) from the left side on the inverse matrix $S^{-1}$, the unknown inertial force vector can be found as:

$$X = S^{-1} \times (B - O). \qquad (2)$$

It is important to mention that three is the minimum number of independent signals that is necessary in order to determine three components of acceleration vector.

In the extension of the invented method more than three stress-sensitive components are used to measure inertial force vector. Although only three stress-sensitive components are required in order to determine all three components of acceleration vector, additional components can be used to increase accuracy of measurements, reduce number of calculations necessary to determine three components of acceleration vector in an orthogonal coordinate system, provide compensation for influencing parameters, for example temperature, and add self-diagnostic capabilities to the device.

This embodiment is illustrated by FIG. 4(a)-(b). FIG. 4(a) illustrates a three-axis accelerometer die made from a single semiconductor substrate and having side 1, shown in FIG. 4a, and an opposite side 2. This sensor die comprises a frame element 12, which is separated from proof mass element by slots 168, 170 and 172. The entire proof mass element consists from several parts: the central part 160 and parts 162, 164 and 166. All these parts together represent the proof mass element. This proof mass element has two dimensions in the plane parallel to side 1 defined as follows. The coordinate system (X, Y, Z axes) is chosen such that X and Y axes are located in the plane of side 1 and parallel to the sidewalls of the chip. The Z-axis is perpendicular to side 1 and the origin is located in the projection of a center of gravity of the proof mass onto the side 1. Each of X, Y, Z dimensions of the proof mass is defined as maximum difference between corresponding coordinates of any two points of the proof mass. For example, in FIG. 4a the dimension of the proof mass in Y-direction is $Y_{PM}$ from line 174 to line 176 of the proof mass. As seen, $Y_{PM}$ is a difference between the Y-coordinates of lines 174 and 176 corresponding to the edges of the proof mass. Similarly, the proof mass has the dimension in X-direction. Related to Z-direction the important characteristic of the proof mass is that the entire proof mass is made within the thickness of the initial monocrystalline substrate.

The semiconductor sensor chip comprises also an elastic element besides frame element and proof mass element. The elastic element of the sensor die has three separate parts or beams 13, 14 and 19. These beams are mechanically coupling the frame 12 of the sensor die with central part of the proof mass 160. Each beam comprises one of three stress sensitive components 1, 3 and 5. The elastic element is defined as a totality of all flexible components such as beams, diaphragms, springs and combination, which mechanically couples the frame and proof mass elements. In FIG. 4a the elastic element represented by all three beams has two dimensions in the plane parallel to the side 1 of the die. Each of X, Y, Z dimensions of the elastic element is defined as maximum difference between corresponding coordinates of any two points of the elastic element. These two points certainly might be on different beams when the overall dimension is determined. For example, in FIG. 4a the dimension of the elastic element in Y-direction is $Y_{EE}$ from line 178 to line 180 of the elastic element. As seen, $Y_{EE}$ is a difference between the Y-coordinates of lines 180 at the edge of the beam 14 and line 178 at the edge of the beam 13. Similarly the elastic element has the overall dimension in X-direction.

As illustrated in FIG. 4a, the beam 14 is adjacent to proof mass from sides 182 and 186 and also connected to the central part 160 of the proof mass at the end 184 of the beam. The proof mass has an opening 188 from side 2 of the sensor die exposing the beam 14, as a separate part of the elastic element, from side 2.

Electrical connections to the stress sensors 1, 3, 5 can be provided without extending the metal lines onto the elastic element. The three stress sensors have independent sensitivities by design of the three-axis accelerometer proof mass, elastic element, stress-sensitive components. Therefore, after calibration three signals from these three stress sensors allows measuring of all three components of unknown inertial force vector according to the present invention.

FIG. 4b shows another three-axis accelerometer die having a frame 12, a proof mass 16, and an elastic element 14. Four stress sensors 1, 3, 5, and 7 are located on the elastic element, i.e. on four beams. By using stress-sensitive components in addition to the three it is possible to increase both reliability and accuracy of the three-axis accelerometer. Better accuracy can be achieved by making multiple simultaneous measurements of the inertial force vector using different sets of three stress-sensitive components. For example, as described in the embodiment referring to FIG. 4b, four stress sensitive components 1, 3, 5 and 7 allow to organize four sets of three components, each of which is sufficient for determining X, Y, Z components of applied inertial force.

Let us consider it in more detail. Three stress sensitive components 1, 3 and 5 allow forming a system of three equations written in the matrix form as:

$$A_{xyz} = S_{135}^{-1} \times (B_{135} - O_{135}). \quad (3)$$

In a regular form this system looks like $$\begin{aligned} Ax &= S_{1x}^{-13} x(B_1 - O_1) + S_{3x}^{-13} x(B_3 - O_3) + S_{5x}^{-13} x(B_5 - O_5) \\ Ay &= S_{1y}^{-13} x(B_1 - O_1) + S_{3y}^{-13} x(B_3 - O_3) + S_{5y}^{-13} x(B_5 - O_5) \\ Az &= S_{1z}^{-13} x(B_1 - O_1) + S_{3z}^{-13} x(B_3 - O_3) + S_{5z}^{-13} x(B_5 - O_5) \end{aligned} \quad (3a)$$

where $B_1$, $B_3$, $B_5$ are output signals of stress-sensitive components 1, 3 and 5 correspondingly, $O_1$, $O_3$, $O_5$ are offsets of stress-sensitive components 1, 3 and 5. Coefficients $S_{1x}^{-13}$, $S_{3y}^{-13}$, $S_{5z}^{-13}$, etc. are components of inverse matrix of sensitivities $$S_{135}^{-1} \equiv \begin{pmatrix} S_{1x}^{-13} & S_{3x}^{-13} & S_{5x}^{-13} \\ S_{1y}^{-13} & S_{3y}^{-13} & S_{5y}^{-13} \\ S_{1z}^{-13} & S_{3z}^{-13} & S_{5z}^{-13} \end{pmatrix}, \quad (3b)$$

defined, as inversed by superscript index -1, as belonging to system of equation (3) by superscript index -13, and as corresponding to stress-sensitive components 1, 3 and 5 by subscripts 1, 3, 5, and also as corresponding to components of the force vector Ax, Ay and Ax by subscripts x, y, z.

Each component $S_{1x}^{-13}$, $S_{3y}^{-13}$, $S_{5z}^{-13}$, etc. of the inverse matrix $S_{135}^{-1}$ is a function of certain combination of components $S_{1x}$, $S_{3y}$, $S_{5z}$, etc. of the matrix of sensitivities $S_{135}$:

$$S_{135} \equiv \begin{pmatrix} S_{1x} & S_{3x} & S_{5x} \\ S_{1y} & S_{3y} & S_{5y} \\ S_{1z} & S_{3z} & S_{5z} \end{pmatrix} \quad (3c)$$

Three stress sensitive components 3, 5 and 7 allow forming another system of three equations:

$$Axyz = S_{357}^{-1} \times (B_{357} - O_{357}). \quad (4)$$

In a regular form this system looks like $$\left. \begin{array}{l} Ax = S_{3x}^{-14} x(B_3 - O_3) + S_{5x}^{-14} x(B_5 - O_5) + S_{7x}^{-14} x(B_7 - O_7) \\ Ay = S_{3y}^{-14} x(B_3 - O_3) + S_{5y}^{-14} x(B_5 - O_5) + S_{7y}^{-14} x(B_7 - O_7) \\ Az = S_{3z}^{-14} x(B_3 - O_3) + S_{5z}^{-14} x(B_5 - O_5) + S_{7z}^{-14} x(B_7 - O_7) \end{array} \right\}, \quad (4a)$$

where $B_3$, $B_5$, $B_7$ are output signals of stress-sensitive components 3, 5 and 7 correspondingly, $O_3$, $O_5$, $O_7$ are offsets of stress-sensitive components 3, 5 and 7. Coefficients $S_{3x}^{-14}$, $S_{5y}^{-14}$, $S_{7z}^{-14}$, etc. are components of inverse matrix of sensitivities $$S_{357}^{-1} \equiv \begin{pmatrix} S_{3x}^{-14} & S_{5x}^{-14} & S_{7x}^{-14} \\ S_{3y}^{-14} & S_{5y}^{-14} & S_{7y}^{-14} \\ S_{3z}^{-14} & S_{5z}^{-14} & S_{7z}^{-14} \end{pmatrix}, \quad (4b)$$

defined, as inversed by superscript index -1, as belonging to system of equation (4) by superscript index -14, and as corresponding to stress-sensitive components 3, 5 and 7 by subscripts 3, 5, 7, and also as corresponding to components of the force vector Ax, Ay and Ax by subscripts x, y, z.

Each component $S_{3x}^{-14}$, $S_{5y}^{-14}$, $S_{7z}^{-14}$, etc. of the inverse matrix $S_{357}^{-1}$ is a function of certain combination of components $S_{3x}$, $S_{5y}$, $S_{7z}$, etc. of the matrix of sensitivities $S_{357}$:

$$S_{357} \equiv \begin{pmatrix} S_{3x} & S_{5x} & S_{7x} \\ S_{3y} & S_{5y} & S_{7y} \\ S_{3z} & S_{5z} & S_{7z} \end{pmatrix} \quad (4c)$$

Correspondingly stress sensitive components 5, 7, 1 and 7, 1, 3 allow forming additional two systems of three equations (5) and (6):

$$Axyz = S_{571}^{-1} \times (B_{571} O_{571}) \quad (5)$$

$$Axyz = S_{713}^{-1} \times (B_{713 \times} O_{713}) \quad (6)$$

It should be clear that system (3) is based on output signals of stress-sensitive components $B_1$, $B_3$, $B_5$ and has coefficients $S_{1x}^{-13}$, $S_{3y}^{-13}$, $S_{5z}^{-13}$, etc. depending on the combination of the components of the matrix of sensitivities $S_{135}$, which is unique. System (4) is based on different output signals of stress-sensitive components, namely on $B_3$, $B_5$, $B_7$ and has coefficients $S_{3x}^{-14}$, $S_{5y}^{-14}$, $S_{7z}^{-14}$, etc. of the inverse matrix $S_{357}^{-1}$, which are functions of certain combination of components $S_{3x}$, $S_{5y}$, $S_{7z}$, etc. of the matrix of sensitivities $S_{357}$, which is also unique and different from matrix $S_{135}$. Therefore, system (4) allows obtaining the similar result of unknown force vector components Ax, Ay, AZ, as well as system (3), but from a combination of different initial parameters. Hence system (4) is independent on system (3).

Similarly systems (5) and (6) are also independent and therefore all four systems (3), (4), (5) and (6) are independent on each other because they are based on different sets of variables.

Therefore, these four independent systems of equations allow to measure and calculate four results of the same X, Y, Z inertial force components. Although the results of these four calculations or measurements are similar they are not exactly the same because they are based on different combinations of preliminary measured parameters. Each of the measurement has its limited accuracy and, as a result, each set of calculated X, Y, Z inertial force components will have slightly different error from the "true" unknown value.

Further data processing allows increasing accuracy and reliability of measurements. In particular, averaging the results of four simultaneous measurements decreases measurement noise and increases accuracy. Further increase of number of sensors allows forming a large number of independent groups of three sensors and making a large number of simultaneous measurements. Measurement noise decreases proportionally to the square root of the number of measurements.

Additional to three stress-sensitive components also increases the reliability of the whole device. If one of the stress sensitive components (1, 3, 5 or 7) would fail the remaining group of three stress-sensitive components still will be giving the measurements result. Modern data processing algorithms are capable of detecting not only catastrophic failure of one of the components, but also gradual degradation of performance or long-term instability of some of them. In contrast, if one of the piezoresistors in the prior art devices (8 or 12 resistors) fails, then the entire device will fail.

There is another algorithm for calculation of three components of acceleration vector when a sensor die has four symmetrical with respect to a proof mass beams and similar located four stress-sensitive elements, one on each beam. If the die, shown in FIG. 4(b), is subjected to a vertical acceleration then all four stress sensors 1, 3, 5, and 7 generate the same signal because of the structure symmetry. If the die is subjected to lateral acceleration along axis OX then the proof mass tends to move in rocking mode causing opposite signals of sensors 3 and 7. With proper design of the suspension it is possible to have a negligible signal from sensors 1 and 5 in response to lateral acceleration along axis OX. If the die is subjected to lateral acceleration along axis OY then the proof mass tends to move in rocking mode causing opposite signals of sensors 1 and 5. With proper design of the suspension it is possible to have a negligible signal from sensors 3 and 7 in response to lateral acceleration along axis OY.

Z component of acceleration vector can be determined using sum of signals from all four sensors. X component of acceleration vector can be determined using differential signal from sensors 3 and 7. Y component of acceleration vector can be determined using differential signal from sensors 1 and 5. With above assumptions, there is no cross dependence in calculations used for X, Y, and Z components of acceleration vector. For example, if the three-axis accelerometer is subjected to Z acceleration then all four sensors generate signals of the same magnitude. Independently on magnitude of Z acceleration, calculated X and Y components of acceleration vector remain equal to zero because they are proportional to a difference between signals of two sensors (sensors 3 and 7 for X component and sensors 1 and 5 for Y component). If X component of acceleration is added now to Z component then signals of sensors 3 and 7 change, but the sum of signals from all four sensors will remain the same because X component of acceleration causes signals of the same magnitude and opposite sign in sensors 3 and 7. This means that measured Z component of acceleration will remain unchanged in the presence of X component. Similarly, Y component of acceleration does not affect X and Z signals.

Therefore, using symmetry of the mechanical structure allows a very significant simplification of calculations required for extracting of three components of acceleration vector from signals of stress sensors. Instead of solving a system of three equations with three unknowns the above-described algorithm requires only adding/subtracting signals from stress sensors. The total number of sensors is still much smaller number than 8-12 sensors used in the prior art and all the advantages of reduced number of sensors remain the same.

Sensitivity of the three-axis accelerometer is proportional to the proof mass and inversely proportional to the stiffness of the suspension. Therefore, sensitivity can be increased by decreasing stiffness of the suspension and by increasing the proof mass. If stiffness of the suspension is decreased then the same force of inertia causes larger stresses in the suspension and larger displacement of the proof mass. Consequently, sensors used in the three-axis accelerometer provide larger signals. If proof mass is increased then the same acceleration generates larger force of inertia and, therefore, causes larger stress/displacement and sensors provide larger signals. Either decreasing stiffness of the suspension or increasing the proof mass results in the sensitivity increase both in case of the stress sensors and displacement sensors. These are some of general directions for improving parameters of the three-axis accelerometer.

Examples of mechanical structures of three-axis accelerometer die according to the present invention are shown in FIGS. 5-11.

Figure 5:
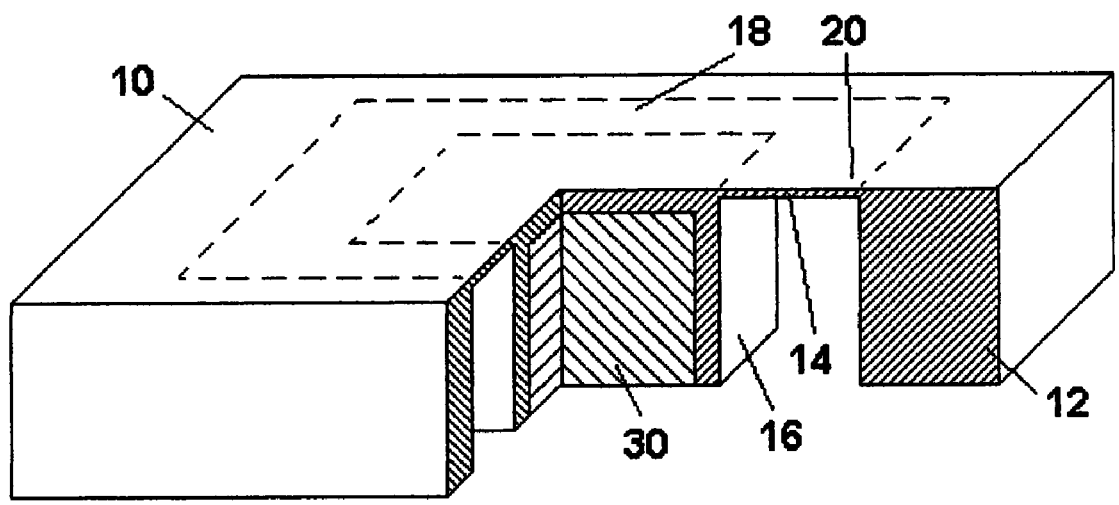
FIG. 5 shows mechanical microstructure of a three-axis accelerometer according to the third embodiment of the present invention

FIG. 5 shows a structure of a three-axis accelerometer die according to a third embodiment. The die 10 has a frame 12, uniform square diaphragm suspension with sides 18 and 20 of span 14, and a proof mass 16 in the form of a parallelepiped.

The improvement made to the three-axis accelerometer shown in FIG. 5 is by using a composite proof mass 16 consisting of two parts. The first part is integral with the semiconductor substrate used in fabrication of the sensor die. This part forms an outer portion of the proof mass 16 shown in FIG. 5. The inner portion 30 of the proof mass 16 is made out of a material having average density significantly higher than that of silicon. Using a composite proof mass gives significant increase of sensitivity. Preferably, metals and alloys like W, Au, Cu, Ta, Pb—Sn and others can be used in order to make the central part of the proof mass. For example, if silicon occupies one third and tin-lead alloy with density of 10.0 mg/mm$^3$ occupies two thirds of the volume of the proof mass than its average density is close to 7.4 mg/mm$^3$ or 3.2 times higher than density of silicon (2.3 mg/mm$^3$). Therefore, sensitivity of the three-axis accelerometer with such composite proof mass is more than 3 times higher than sensitivity of another one that has silicon proof mass of the same geometry. Tungsten and gold have density of about 19 mg/mm$^3$ or more than 8 times higher than silicon and this allows even bigger increase of the proof mass and sensitivity of the three-axis accelerometer.

Another advantage of using composite proof mass, for example, metal-silicon proof mass, is that it allows changing position of the center of gravity and, therefore, adjustment of lateral-to-vertical acceleration sensitivity ratio toward the desired range.

FIG. 5 shows a structure of three-axis accelerometer with a cavity in the proof mass filled with metal. Bonding metal to silicon can be done by heating up the structure to the temperatures where silicon and metal forms a silicide. For example, in order to bond gold to silicon it is necessary to heat up the structure to the temperatures above 363° C. when Si—Au eutectic is formed. Alternatively, bonding can be done by using alloys with some chemically active components that can promote chemical bonding of silicon to metal. For example, alloys containing metals that can remove oxide from silicon dioxide and, therefore, reduce silicon from silicon dioxide can be used. Being heated in contact with silicon these alloys destroy native oxide film on the surface of silicon and bond to silicon. Some rare earth elements, like erbium or lutetium, can reduce silicon from silicon dioxide and promote bonding of metal to silicon.

Another approach can be used in this structure for connection silicon with metal. Micromachining of silicon is done in such a way that sidewall profile has a negative slope. If cavity with walls having negative slope is filled with metal and metal is solidified inside such a cavity then the metal part is trapped in the cavity due to shape of the formed metal part. Negative slope of the sidewalls can be achieved by using RIE or combination of RIE and wet etching. Shape of the such cavity can be achieved by starting micromachining with RIE followed by wet anisotropic etching.

Sensitivity of three-axis accelerometer with these structures to acceleration is determined by its proof mass and stiffness of the suspension. Stiffness of the diaphragm suspension can be reduces by making it thinner or larger. Decreasing thickness of the suspension does not affect the proof mass. However, there might be limits for decreasing thickness of the suspension related to a micromachining process itself and process control. Increasing size of the diaphragm requires either increasing size of the sensor ship or decreasing size of the proof mass. In both cases consequences are undesirable. Increasing size of the die causes decreasing number of dies per wafer and, consequently, increases cost per die. Decreasing size of the proof mass causes sensitivity decrease.

Although any material with higher density than silicon (metal, alloy, glass, polymer, etc.) can be used in order to increase the average density of the proof mass, only structures with composite silicon-metal mass are illustrated in FIG. 5. Proof mass can be increased by replacing part of silicon proof mass with metal, by filling with metal parts of the trenches etched in silicon, by extending the metal portion of the proof mass beyond the thickness of the sensor chip or by combination of these methods.

In another structure metal is extending beyond the bottom surface of the sensor chip. This allows additional increase of the proof mass and also provides greater flexibility in adjusting position of the center of gravity in comparison with other designs.

Another option of increasing sensitivity by decreasing stiffness of the suspension is the partial releasing of the diaphragm connection with the frame according to the fourth embodiment. One way to do that is to make narrow slots in the diaphragm somewhere between the connection area with the proof mass and the frame. In general, the slots can be curved. Some portions of the slots can be oriented along the radial directions toward the center of the diaphragm. The other portions can be tangential. The resulting suspension has smaller stiffness and supports the same proof mass. Therefore, structure with the slotted diaphragm has higher sensitivity than one with a solid diaphragm suspension.

Figure 7:
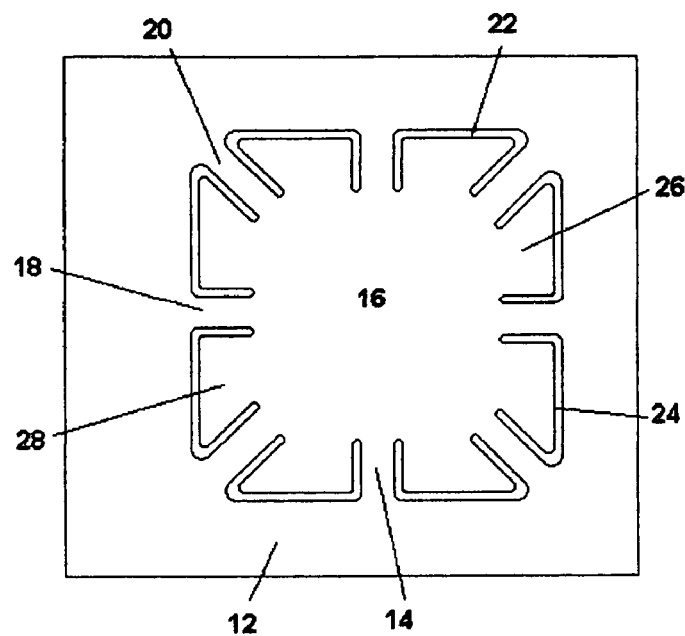
FIG. 7 shows mechanical structure of a three-axis accelerometer with a diaphragm perforated with multiple slots resulting in a multiple beam configurations of the elastic element according to the fourth embodiment of the present invention.
Figure 7:
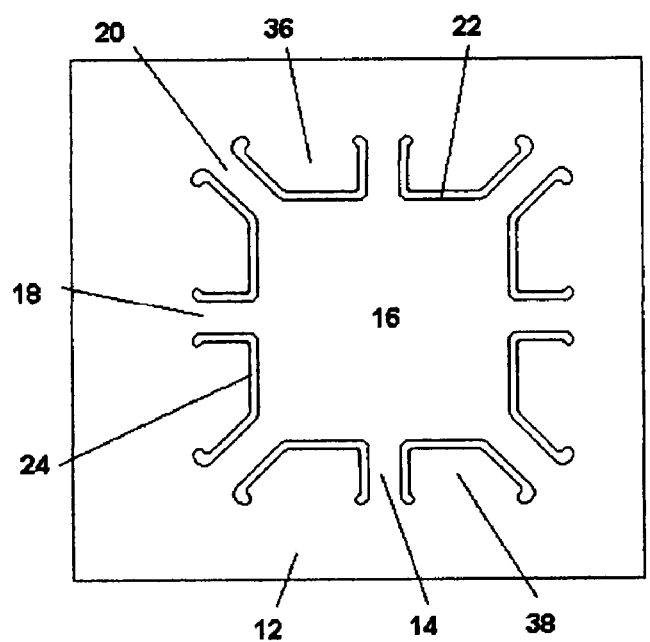
Figure 8:
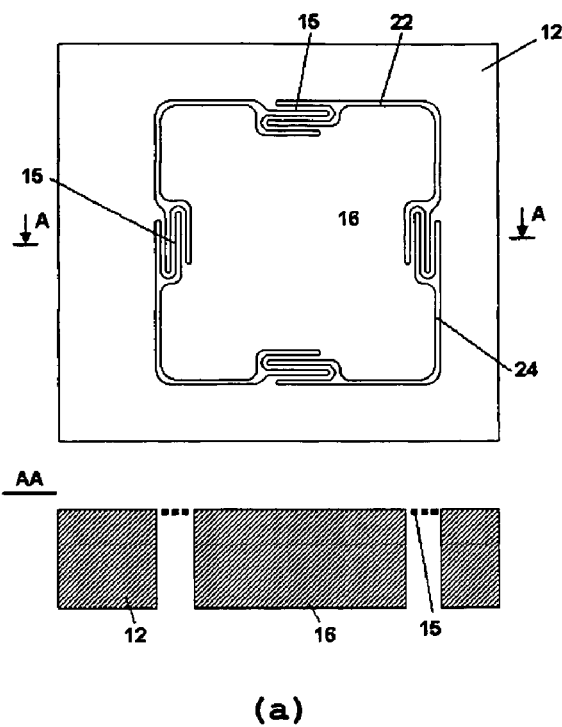
FIG. 8 shows mechanical structure of a three-axis accelerometer with the elastic element in the form of springs of different configurations according to the fourth embodiment of the present invention.
Figure 8:
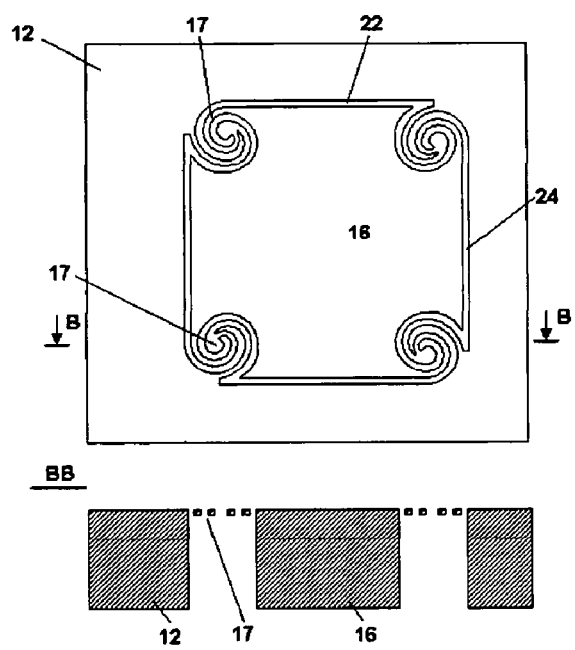

Numerous suspension shapes and numerous proof mass shapes can be created by micromachining of the proof mass and making slots in the diaphragm. Some designs are shown in FIGS. 6-8.

Figure 6:
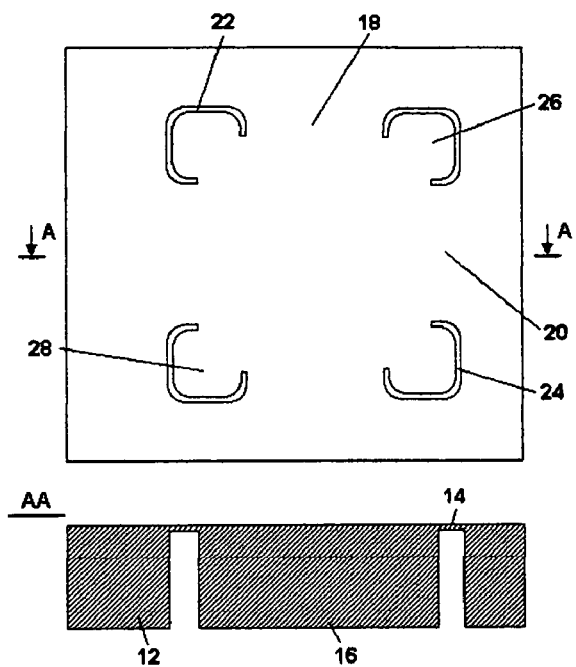
FIG. 6 shows mechanical structure of a three-axis accelerometer with the elastic element in the form of a diaphragm perforated with slots of different configurations according to the fourth embodiment of the present invention.
Figure 6:
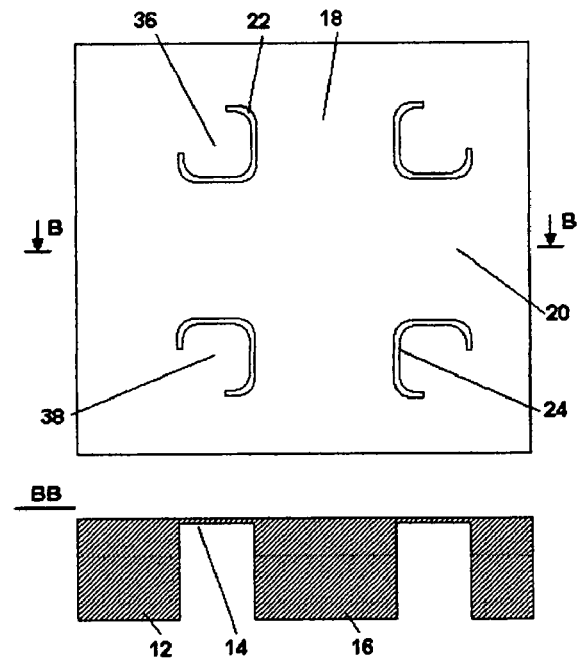

FIG. 6 shows a structure 20 of a three-axis accelerometer. The sensor chip 18 has a frame 12 with a square opening defined by inner walls of the frame. The proof mass 16 is suspended in the opening. Therefore, size of the opening defines the overall size of the suspension and the proof mass. A suspension is formed by making four slots 24 in the diaphragm 14. The suspension 18 connects the proof mass 16 with the central portions of the inner walls of the frame 12.

Depending on the orientation of the slots 24, the areas 26, 28, 36, 38 adjacent to the slots can be used either for increasing the proof mass or for IC components and circuits. For example, areas 26 and 28 shown in FIG. 6a can be added to the proof mass. This increases the proof mass in comparison with the structure having a solid diaphragm of the same size and, consequently, increases sensitivity of the three-axis accelerometer.

In the structure shown in FIG. 6b areas 36 and 38 adjacent to the slots 24 can be used for IC components. The area occupied by the proof mass and suspension on the top side of the sensor die is reduced in comparison with the structure having a solid diaphragm of the same size. Consequently, some of IC components and circuits can be placed in these areas and die size can be reduced.

Another structure of three-axis accelerometer 18 in presented in FIG. 7. Diaphragm-based suspension has eight slots 24. Suspension connects the proof mass 16 with the frame 12 both in the center by four beams 14 and at the corners by four beams 20.

Similarly to the above-described structure shown in FIG. 6, the areas 26, 28, 36, 38 adjacent to the slots can be used either for increasing the proof mass or for IC components and circuits. For example, areas 26 and 28 shown in FIG. 7a can be added to the proof mass. This increases the proof mass in comparison with the structure having a solid diaphragm of the same size and, consequently, increases sensitivity of the three-axis accelerometer.

In the structure shown in FIG. 7b areas 36 and 38 adjacent to the slots 24 can be used for IC components. The area occupied by the proof mass and suspension on the top side of the sensor die is reduced in comparison with the structure having a solid diaphragm of the same size. Consequently, some of IC components and circuits can be placed in these areas and die size can be reduced.

Another structure of three-axis accelerometer in presented in FIG. 8a. Suspension is formed by making slots 22, 24 in the diaphragm. As it can be seen from FIG. 8a, slots have branching points and branches of adjacent slots are located in the same area of the diaphragm defining a spring-like structure 15.

Still another structure of three-axis accelerometer in presented in FIG. 8b. Suspension is formed by making slots 22, 24 along the sides of the diaphragm. The slots combine straight portions that define areas where the diaphragm is separated from the frame and curved portions located close to the corners of the diaphragm that define connection of the frame with the proof mass. As it can be seen from FIG. 8b, curved portions of adjacent slots form spring-like structures 17 serving as suspension of a proof mass.

Design of three-axis accelerometer utilizing stress sensors can be improved by using suspensions with stress concentrators according to fifth embodiment. Stress concentrators localize the desired level of stress only in the specific areas of suspension, where stress sensitive IC components are located. It makes the rest of the suspension is less stressed and more reliable. Therefore, using stress concentrators allows increasing thickness or width of the suspension while keeping the same or somewhat higher sensitivity than without stress concentrators. Thicker suspension allows better control and, therefore, provides better reproducibility and reliability. Wider suspension allows placing larger number of stress sensors in the same area that can be used for reduction of cross-axis sensitivity or increasing sensitivity. Alternatively, the size of the sensor can be decreased.

Figure 9:
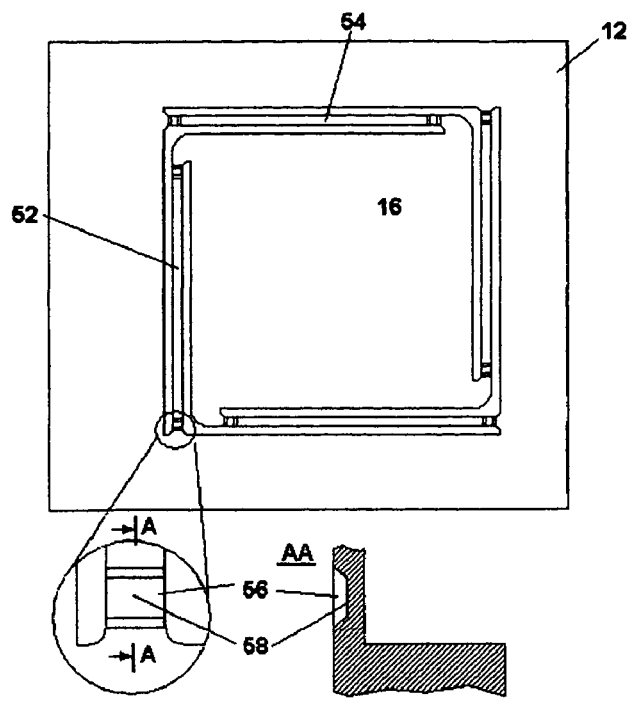
FIG. 9 shows mechanical structure of a three-axis accelerometer with stress concentrators on the elastic elements of a sensor, where the stress sensitive IC components can be located, according to the fifth embodiment of the present invention.
Figure 9:
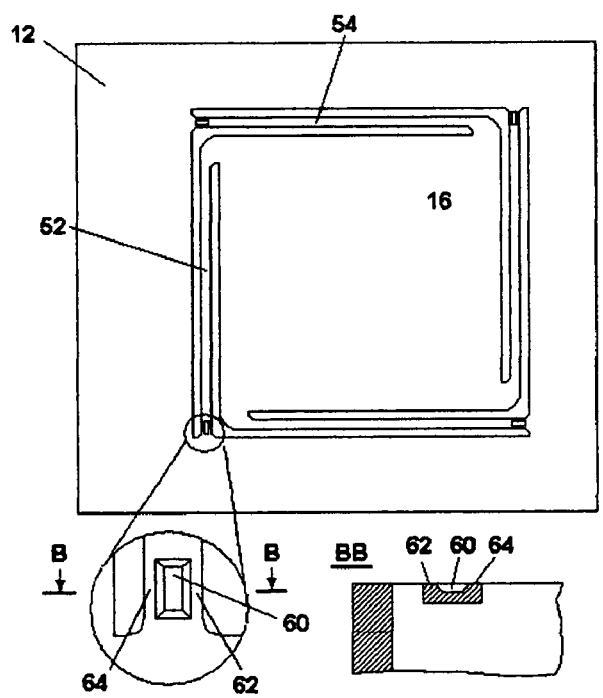

An example of a three-axis accelerometer structure with stress concentrators is shown in FIG. 9. Shallow cavities 56, 60 are formed at the edge of the L-shaped beams 52, 54 where beams are connected to the frame and/or to the proof mass. Stress sensors can be formed in the stress concentration areas, therefore, increasing sensitivity of the three-axis accelerometer. For example, sensors can be placed in areas 58 in the structure shown in FIG. 9a and in areas 62 and 64 in the structure shown in FIG. 9b.

Figure 10:
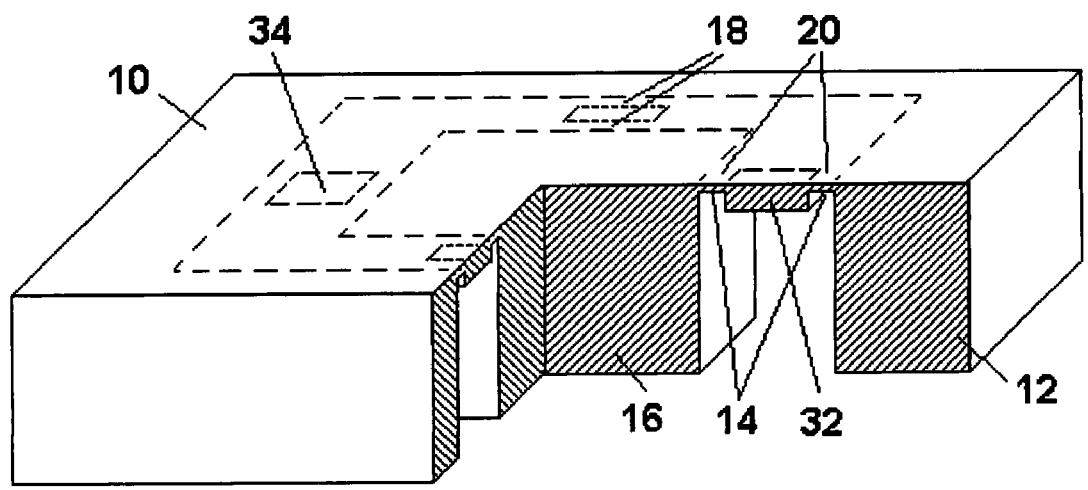
FIG. 10 shows mechanical structure of three-axis accelerometer with stress concentrators on the elastic elements of a sensor based on a rigid bosses between the areas, where the stress sensitive IC components can be located, according to the sixth embodiment of the present invention.

Another option to increase sensitivity and reliability is making diaphragm thickness non-uniform. FIG.10 shows structure of three-axis accelerometer 10 with diaphragm suspension having non-uniform thickness according to sixth embodiment. The structure has a frame 12 and proof mass 16 connected by a diaphragm suspension 14. Diaphragm 14 has non-uniform thickness. It has several islands 32, 34 that are thicker than the rest of the diaphragm (so called "bosses"). Diaphragm with non-uniform thickness is more robust than the uniform diaphragm of the same size and thickness. Besides, it provides areas 18, 20 located between the bosses and the proof mass that features uniform stress distribution and improved linearity of stress dependence on applied load. Therefore, stress-sensitive components placed in these areas have better linearity of transduction characteristic.

Proof mass and suspension are formed using deep etching from the backside of the wafer. Both dry etching, for example, deep reactive ion etching (RIE) and wet etching, for example, anisotropic etching in alkaline solutions, TMAH, or amid-containing solutions can be used for micromachining. Structures in FIG. 4-10 are shown, as made with dry etching.

Figure 11:
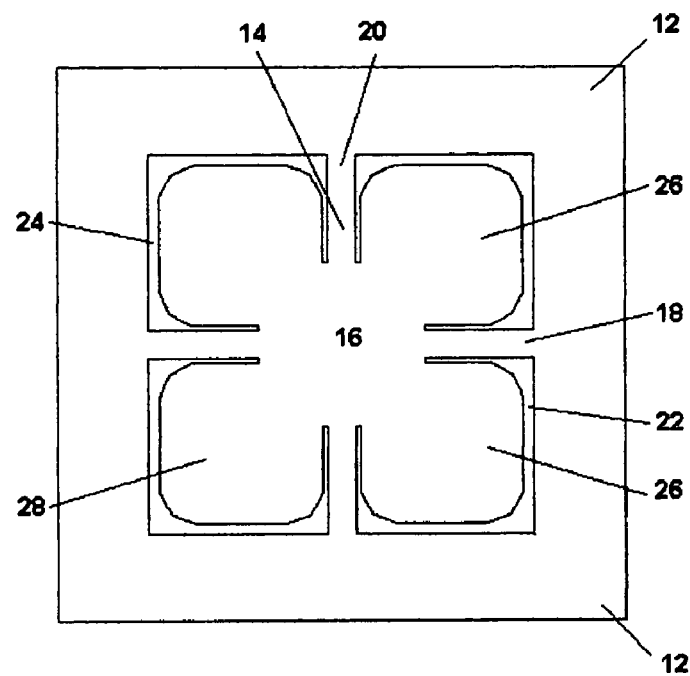
FIG. 11 shows mechanical structure of a three-axis accelerometer fabricated with anisotropic etching of silicon according to the seventh embodiment of the present invention.
Figure 11:
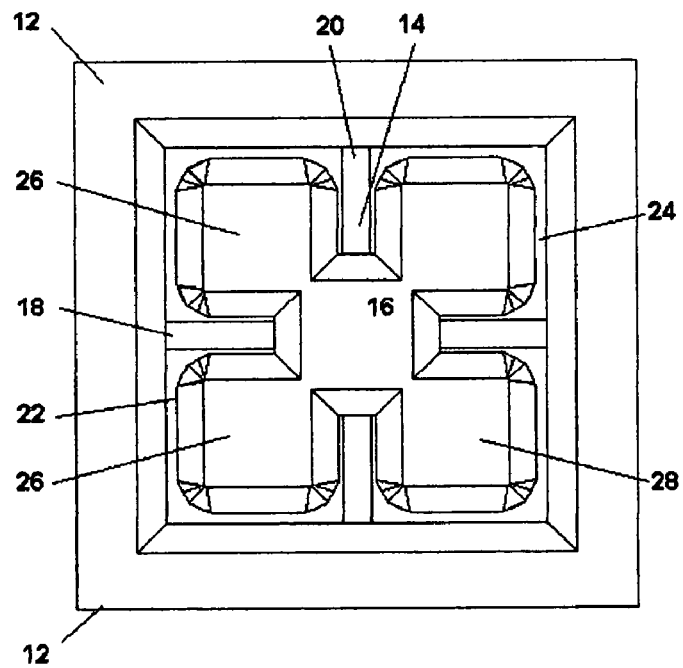

FIG. 11 shows a structure of three-axis accelerometer formed with deep wet anisotropic etching of (100) Si wafer from the back side according to seventh embodiment. The three-axis accelerometer die shown in FIG. 11 has a frame 12 and a proof mass 16. Slots 22, 24 define a four-beam suspension. Beams 14 extend toward the center of the proof mass 16. As a result, the proof mass has five sections: the central one and four corner section 26, 28 connected to the central section. The slots 24 between the frame and the proof mass can be open using either shallow dry etching or shallow wet etching either from the front side or from the both sides of the sensor wafer.

In all above-described designs of the three-axis accelerometer structures the suspension is formed by etching a semiconductor substrate. As a result, there is a volume around the proof mass, which potentially can be used in order to increase the proof mass. One way to use this volume is illustrated in FIG. 12 according to an eighth embodiment.

Figure 12:
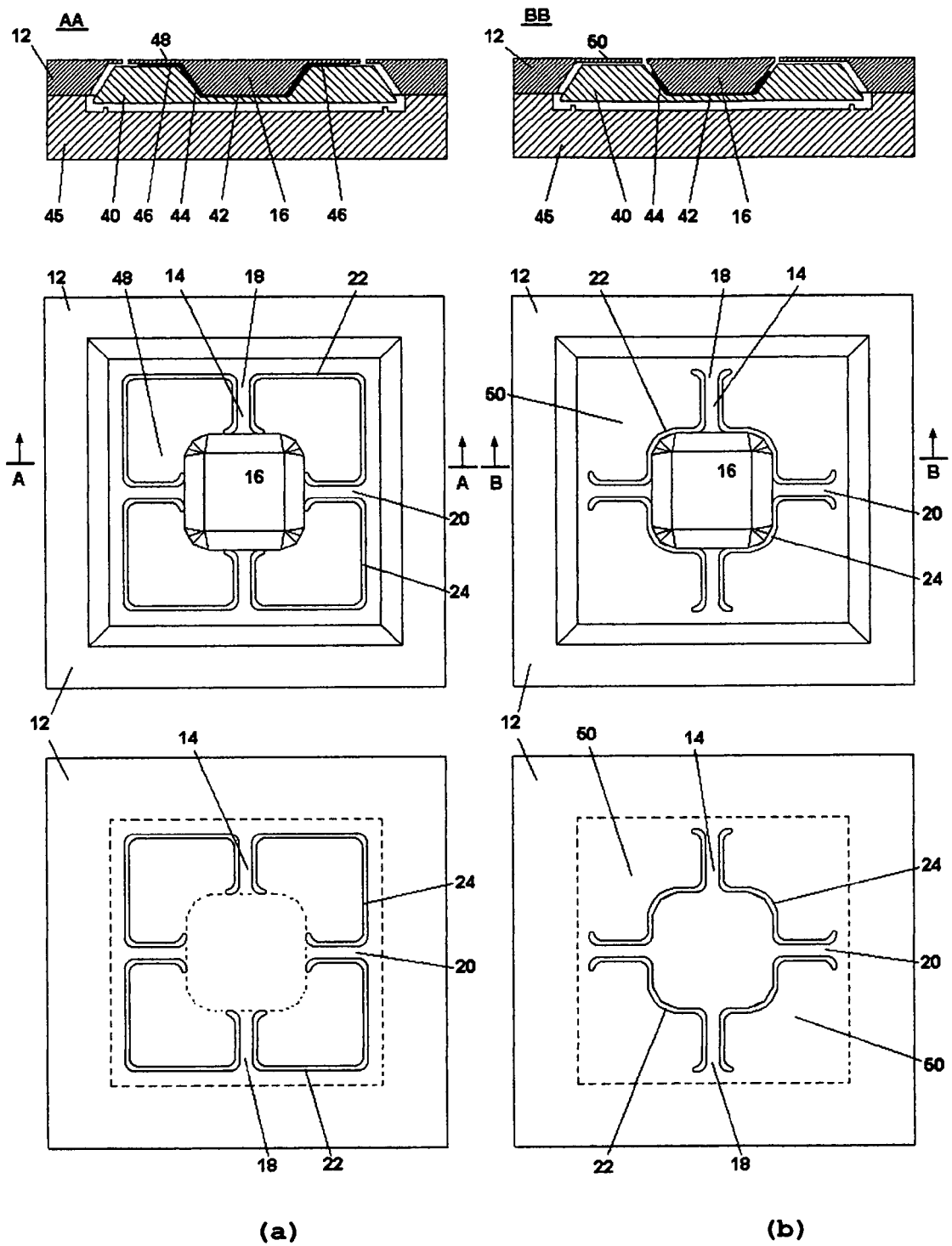
FIG. 12 shows mechanical structure of three-axis accelerometer with the proof mass occupying the volume between the central boss, the frame of a sensor die, and the bottom cap of a sensor according to the eighth embodiment of the present invention.

FIGS. 12(*a*), (*b*) shows a structure of three-axis accelerometer where a proof mass is formed from two parts. One part 16 is integral to the initial semiconductor substrate used in fabrication of the sensor die and the other part 40 is coupled to the first one in order to increase the proof mass by using the volume between the proof mass and the frame.

The three-axis accelerometer die shown in FIG. 12(*a*), (*b*) has a frame 12 and a proof mass 16. The frame 12 and the proof mass 16 are connected with a uniform-thickness suspension beams 14. The suspension is formed by etching slots 22, 24 in the diaphragm connecting the proof mass 16 and the frame 12 and deep etching from the back side of the wafer.

The second part of the proof mass 40 can be coupled to the first part 16 in the areas 42 at the bottom part of part 16, in the areas 44 on the sidewalls of the part 16 and also in the areas 46 coupling it with the top areas 48, as it shown, when the slots 22, 24 are made at the periphery of the proof mass close to the frame, as it shown in FIG. 12(*a*).

The second part of the proof mass 40 can be coupled to the first part 16 in the areas 42 at the bottom part of part 16, in the areas 44 on the sidewalls of the part 16 only, when the slots 22, 24 are made at the periphery of the first part of proof mass close to the center of the die, as it shown in FIG. 12(*b*).

The second part of the proof mass 40 in some cases can extend beyond the bottom surface of the sensor die, as it shown in FIG. 12(*a*), (*b*). It can additionally increase the mass of a proof mass and increase sensitivity. This additional extending part of the second part of the proof mass can be accommodated within the thickness of the bottom cap 45, as it shown in FIG. 12(*a*),(*b*).

Therefore, for the purpose of increasing sensitivity the proof mass can be extended in planar dimensions beyond the overall dimensions of a suspension and in thickness beyond the thickness of the sensor die.

Figure 13:
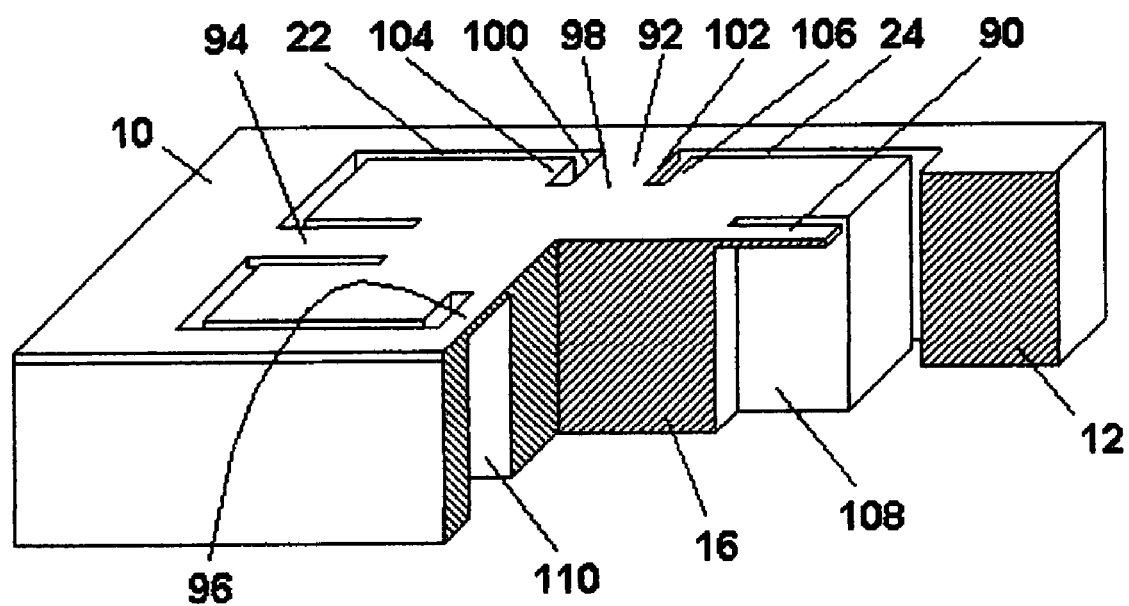
FIG. 13 shows mechanical structure of a three-axis accelerometer with elastic element consisting from four beams each adjacent to the proof mass from two sides and connected to the proof mass at one end according to the ninth embodiment of the present invention.
Figure 14:
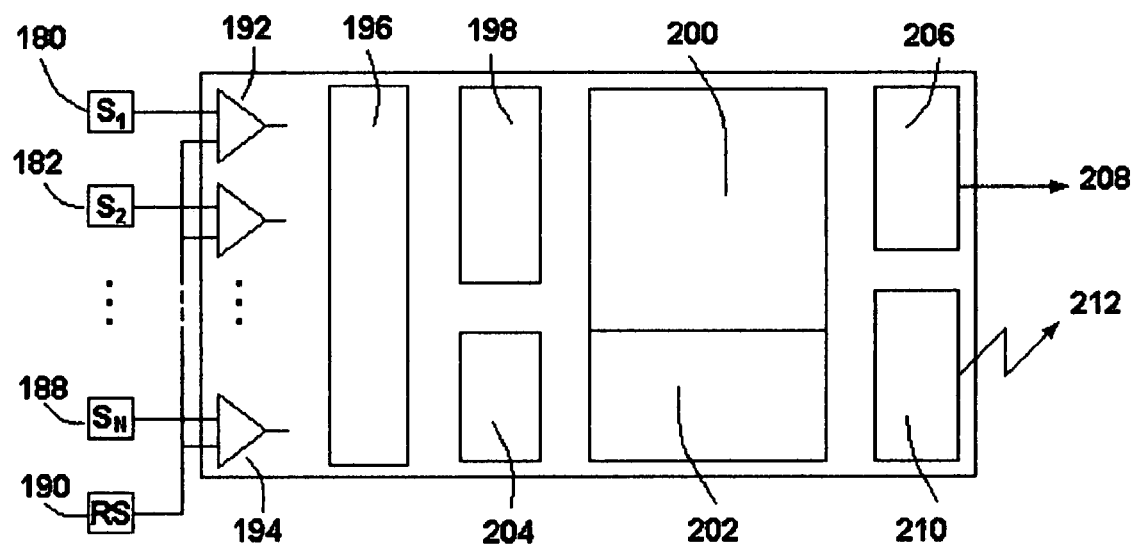
FIG. 14 shows a generalized three-axis accelerometer block-diagram comprising reference signal, signal conditioning circuits and digital signal processing circuit, memory, wireless and interface.

FIG. 13 shows a 3D accelerometer die according to the ninth embodiment. The 3D accelerometer die 10 has a frame 12 and a proof mass 16. The frame 12 and the proof mass 16 are connected with a suspension that includes four beams 90, 92, 94, 96. Each beam has two sides and two ends.

The connection and mutual position of beams and proof mass is similar for all beams and illustrated by the beam 92 in FIG. 13. One end 98 of the beam 92 is connected to the proof mass 16 and two sides 100, 102 of the beam 92 are separated from the adjacent sections 104, 106 of the proof mass 16 by etched slots 22 and 24. Therefore, each beam 90, 92, 94, 96 is adjacent to the proof mass 16 from two sides and connected to the proof mass at one end.

The sensor has openings 108, 110 fully exposing the beams 90 and 96 from the back side of the sensor die 10, as it shown in FIG. 13. Similarly beams 94 and 92 are also exposed from the back side of the sensor die.

In 3D accelerometer die 10 according to the ninth embodiment the suspension of beams 90, 92, 94, 96 is formed with combination of front side and deep backside micromachining of the substrate used for fabrication of 3D accelerometer sensor dice. Dry etching, wet etching, or combination of both can be used for both front side and backside micromachining.

This approach allows using standard initial material in fabrication of 3D accelerometer dice, which in turn reduces cost of the device. Both standard uniform material and standard SOI silicon wafers can be used in fabrication of 3D accelerometer according to the ninth embodiment.

The above described approaches for improving parameters of three-axis accelerometers among other things, allow formulating ways of increasing sensitivity and balancing sensitivity between X, Y and Z. If the size of the accelerometer die is defined, then to achieve maximum sensitivity and balance X, Y, Z sensitivities:

(1) the cavity beneath the diaphragm in the bulk of the sensor wafer is maximally filled in with the proof mass either from the same material or from the material with higher density;

(2) the diaphragm can be slotted in a way that slots would separate part of the peripheral diaphragm area from the frame, reducing the connection area between the frame and suspension, and would separate part of the diaphragm from the proof mass;

(3) parts of the slots can extend on the diaphragm with required shape providing optimized length of the path between the connection area with the frame and connection area with the proof mass for making X,Y,Z sensitivities comparable;

(4) filling in volumes between the proof mass and those areas of the diaphragm which, as a result of the slotting, are disconnected from the frame.

The described above approach increases sensitivity, which allow for improving other parameters of accelerometer such as: size, cost, reliability, frequency response, cross axis sensitivity, etc.

It should be understood that the method of measuring three components of inertial force vector with respect to an orthogonal coordinate system, the microstructures of the sensor die do not limit the present invention, but only illustrate some of the various technical solutions covered by this invention. While the invention has been described in detail with reference to preferred embodiments, it is understood that variations and modifications thereof may be made without departing from the true spirit and scope of the invention. For example, although not mentioned specifically, the method of measuring three components of inertial force vector, can also be applied to capacitive sensors as well as other types of sensors.

What is claimed is:

1. A method of determining three components of an applied inertial force with respect to an orthogonal coordinate system, said method comprises the steps of:

providing a semiconductor sensor chip having side 1 and comprising a frame element, a proof mass element and an elastic element mechanically coupling the frame and proof mass element;

selectively positioning only three stress-sensitive IC components integrated into three local areas of the elastic element;

orienting the orthogonal coordinate system such that X and Y axes are located in the plane of side 1 and Z axis is perpendicular to side 1;

applying a known inertial force to the sensor chip along X, Y and Z axes;

determining the matrix of offsets and matrix of sensitivities of the stress-sensitive IC components to the orthogonal components of the known applied force;

determining three orthogonal components of the unknown applied inertial force by solving with digital processing a system of three equations containing the three orthogonal components of the unknown applied force, matrixes of offsets and sensitivities of the stress-sensitive IC components to orthogonal components of the known inertial force vector.

2. A three-axis accelerometer for determining components of an inertial force vector with respect to an orthogonal coordinate system, the accelerometer comprising:

a sensor die made of a semiconductor substrate comprising:
  a frame element;
  a proof mass element;
  an elastic element mechanically coupling the frame and the proof mass, wherein the inertial force applied to proof mass induces stress in the elastic element;
more than three stress-sensitive IC components, which are used for creating more than one sets of three stress-sensitive IC components and integrated into local areas of the elastic element;
a digital signal processing circuit for processing of signals from stress-sensitive IC components;
whereby stress-sensitive IC components generate signals resulting from the stresses in the elastic element and at least one set of three stress-sensitive IC components is used for determining an unknown applied force vector components and the remaining sets of three stress-sensitive IC components are used for increasing the accuracy and reliability of the three-axis accelerometer.

3. A three-axis accelerometer of claim 2, whereby signals generated by stress-sensitive IC components from the applied force, are measured relative to a reference signal for increasing the ratios of the signals to offsets, reducing the temperature dependence of offsets and sensitivities and simplifying signal processing.

4. A three-axis accelerometer of claim 2, wherein the stress sensitive IC components are chosen from the group consisting of: a piezoresistor, a p-n junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit.

5. A three-axis accelerometer of claim 2, further comprising at least one sensor component chosen from the group of sensors consisting of temperature sensor, magnetic sensor, pressure sensor, tactile sensor, acoustic sensor, chemical sensor, humidity sensor, radiation sensor, mass flow sensor, and optical sensor.

6. A three-axis accelerometer of claim 2, wherein the semiconductor substrate is comprised of monocrystalline material exhibiting dependence of mobility of electrons and holes on mechanical stress and chosen from the group consisting of silicon, germanium, silicon carbide, carbon, gallium arsenide, gallium nitride, and indium phosphide.

7. A three-axis accelerometer of claim 2, further comprising at least one electronic circuit providing one or more functions from a group of functions consisting of providing reference signals, signal amplification, multiplexing, signal filtering, analog-to-digital conversion, signal processing, voltage stabilization, current stabilization, memory for compensation coefficients, temperature compensation, digital interface, power management, transmitting and receiving radio-signals.

8. A three-axis accelerometer of claim 7 wherein at least one electronic circuit is located on the sensor die.

9. A three-axis accelerometer of claim 2, wherein the elastic element has at least one opening in its thickness dimension.

10. A three-axis accelerometer of claim 2, wherein the elastic element contains at least two stress concentrating elements having a shape selected from a group of shapes consisting of V-groove, trapezoidal groove, and a groove with the sidewalls forming an angle in the range of $90°\pm5°$ with the surface of the elastic element.

11. A three-axis accelerometer of claim 2, where the elastic element in the sensor chip has the shape chosen from the group of shapes consisting of ring, perforated ring, n-sided faceted geometry, beams, tethers, springs and combinations of these shapes.

12. A method of determining three components of an unknown applied inertial force with respect to an orthogonal coordinate system and increasing accuracy of three-axis accelerometer, said method comprises the steps of:
  providing a semiconductor sensor chip having side 1 and comprising a frame element, a proof mass element and an elastic element mechanically coupling the frame and proof mass element;
  providing more than three stress-sensitive IC components each integrated into a local area of the elastic element;
  orienting the orthogonal coordinate system such that two axes are located in the plane of side 1 and the third axis is perpendicular to side 1;
  applying a known inertial force to the sensor chip along the orthogonal axes for calibration;
  determining the matrix of offsets and matrix of sensitivities of all stress-sensitive IC components to the orthogonal components of the known applied force;
  creating sets of independent systems of three equations based on a number of non-repeating combinations from the number of stress-sensitive IC components in threes; each independent combination of three stress-sensitive IC components corresponds to each independent systems of three equations; each independent system of three equations contains three unknown variables corresponding to orthogonal components of unknown applied force, ($1\times3$) matrix of offsets and ($3\times3$) matrix of sensitivities of the corresponding stress-sensitive IC components to orthogonal components of the known inertial force vector;
  determining three orthogonal components of the unknown applied inertial force by solving at least one independent system of three equations;
  increasing accuracy of determining three components of an applied inertial force by solving other independent systems of three equations and by averaging the results of independent solutions.

13. A method of claim 12, further comprising the step of:
  creating sets of independent systems of three equations based on working stress-sensitive IC components, where the number of sets of independent systems is equal to a number of non-repeating combinations from the number of working stress-sensitive IC components in threes;
  whereby increased reliability of three-axis accelerometer is provided by at least three working stress-sensitive IC components participating in the sets of independent systems of three equations while determining three components of an unknown applied inertial force.

* * * * *